Jan. 28, 1941.  W. C. GROENIGER  2,229,887
FLUSH VALVE
Filed March 18, 1939  2 Sheets-Sheet 1

INVENTOR
William C. Groeniger
BY
HIS ATTORNEY

Jan. 28, 1941.  W. C. GROENIGER  2,229,887
FLUSH VALVE
Filed March 18, 1939  2 Sheets-Sheet 2

INVENTOR
William C. Groeniger
BY
Henry J. Lucke
HIS ATTORNEY

Patented Jan. 28, 1941

2,229,887

UNITED STATES PATENT OFFICE 2,229,887

FLUSH VALVE

William C. Groeniger, Columbus, Ohio, assignor to John B. Pierce Foundation, New York, N. Y., a corporation of New York Application March 18, 1939, Serial No. 262,669

1 Claim. (Cl. 4—57)

My present invention relates to plumbing fixtures and more particularly to an improved flush tank valve.

The present invention is an improved form of controlling valve for a flush tank for a defecator and particularly to a controlling valve of the ball type associated with a side outlet.

A feature of my invention is an improved tank flush valve of the side outlet type.

Another feature of my invention is an improved ball type side outlet flush valve.

A further feature is an improved operating mechanism for a ball valve associated with a side outlet flush valve.

In the accompanying drawings.

Figure 1:
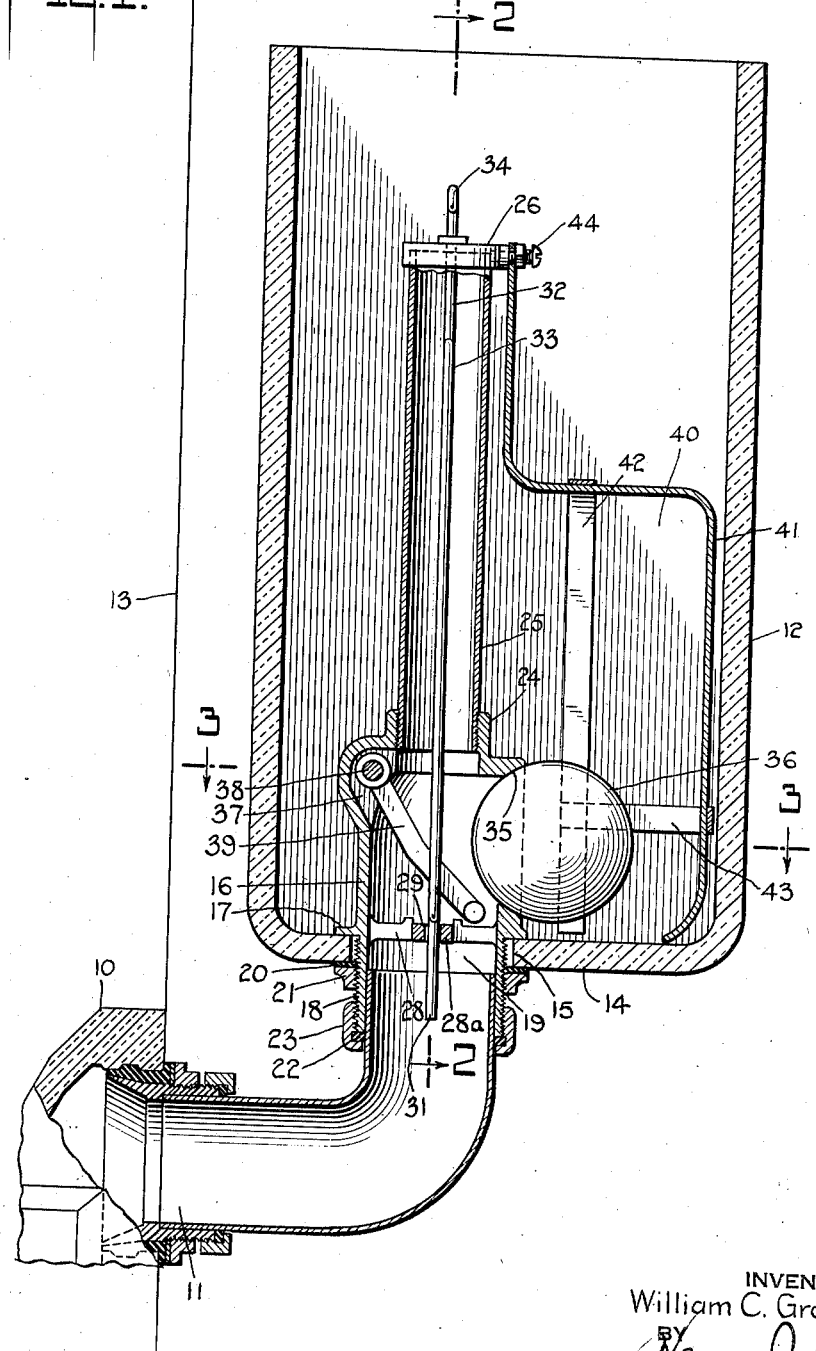
Fig. 1 is a central sectional side elevation of a flush tank to which my present invention has been applied.

Referring to the drawings, 10 designates so much of a defecator as is necessary for an understanding of the present invention, the inlet end of such defecator being shown. Connected to such inlet end in the usual manner is the outlet end of a supply elbow 11. The inlet end of the elbow 11 is associated with a flush tank 12, entering such flush tank from the bottom thereof.

The flush tank 12 is supported adjacent the wall line 13 in any usual and convenient manner. Such tank is preferably a substantially rectangular tank having greater width than depth. The supporting means for said tank 12 on the wall line 13, or on any other supporting media, is not shown as the same is not necessary for an understanding of the present invention.

The bottom 14 of the tank 12 is provided with an orifice 15 preferably symmetrically arranged with respect to the width and depth of such bottom. Mounted within the tank 12 is the structure forming the subject matter of my present invention. This structure comprises a body member 16 having intermediate its ends a flange 17 and the portion below the flange circular in shape and form and externally threaded, as indicated by the reference numeral 18. The body 16 is provided with an internal passage 19 of substantially cylindrical contour and definite diameter, such diameter being substantially the external diameter of the supply elbow 11 above referred to.

The flange 17 rests on the upper surface of the bottom 14 of the tank 12, and the threaded end 18 extends downwardly through the orifice 15. In order to obtain a fluid-tight joint between the body 16 and the tank 12, I provide a washer 20 of relatively soft material, such for example as rubber, and onto the threaded end 18 a nut 21 which forces the washer 20 into intimate engagement with the bottom face of the bottom 14, and the flange 17 into intimate engagement with the upper surface of the bottom 14. If desired, a washer similar to the washer 20 could be interposed between the flange 17 and the upper surface of the bottom 14, but ordinarily this added precaution is not necessary.

The inlet end of the supply elbow 11 extends upwardly into the cylindrical passage 19 of the body 16, and has associated therewith a washer 22 which surrounds the same and engages with the end of the threaded portion 18 of the body 16. Screwing onto the threaded portion 18, and engaging the washer 22, is a packing nut 23 which compresses the washer 22 into intimate engagement with the body 16 and supply elbow 11, thereby insuring a fluid-tight joint between the supply elbow 11 and the body 16.

The upper end of the body 16, in alignment with the substantially cylindrical passage 19, is provided with a boss 24 which is internally threaded to receive the lower threaded end of a stand pipe 25. Also the stand pipe 25 has its upper end threaded to receive a threaded cap 26 provided with a central perforation 27. In the body 16, within the cylindrical passage 19 and substantially in horizontal alignment with the flange 17, is formed the spider 28 having a central boss 28a and radially extending arms. The central boss 28a is provided with a perforation 29 in vertical alignment with the central perforation 27 in the threaded cap 26 at the upper end of the stand pipe 25.

Figure 2:
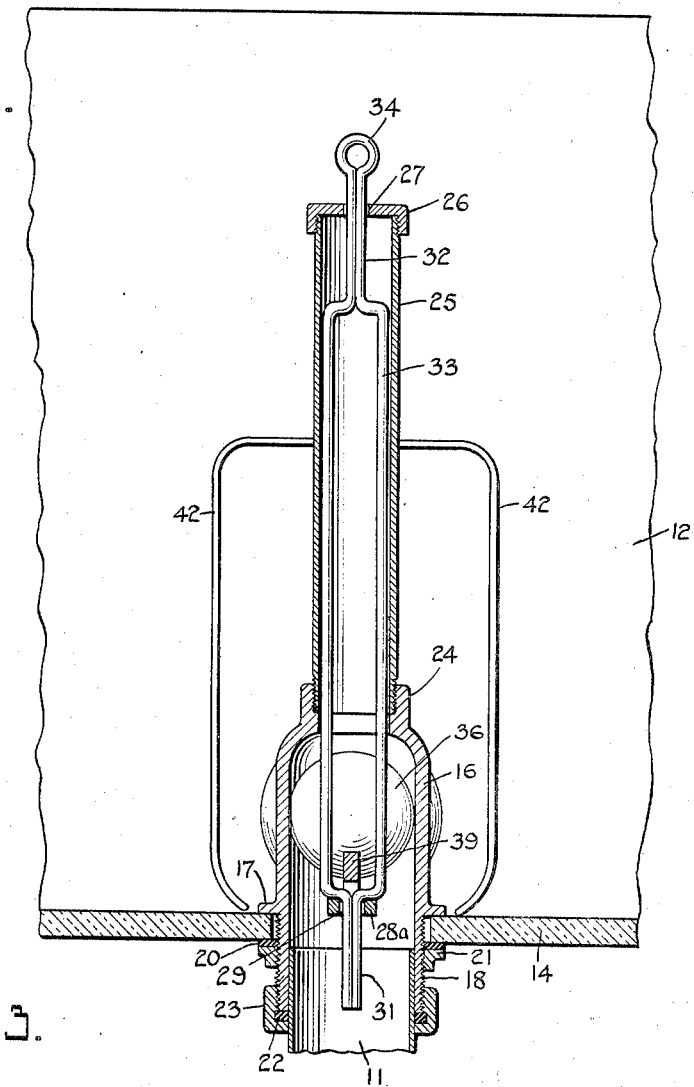
Fig. 2 is a central sectional elevation taken on the line 2—2 of Fig. 1 and moving in the direction of the arrow.

Slidably mounted in the perforations 27 and 29 is a valve operating member composed preferably of wire and of the form shown in Fig. 2, that is, with a lower portion 31 freely slidable in the perforation 29, and an upper portion 32 freely slidable in the perforation 27, and also an intermediate portion 33 which is freely slidable in the stand pipe 25. At the upper end of the upper portion 32 is formed a ring, and by means of which the member may be connected to a valve operating means.

Formed in the side of the body 16 and extending into the internal passage 19 is a valve opening 35, such valve opening being machined to act as a seat for a spherical or ball valve 36. The valve 36 is preferably of metal, and hollow, so as to be lighter than water. However, the valve 36 may be of any material or in any form that will result in a buoyant valve.

Figure 3:
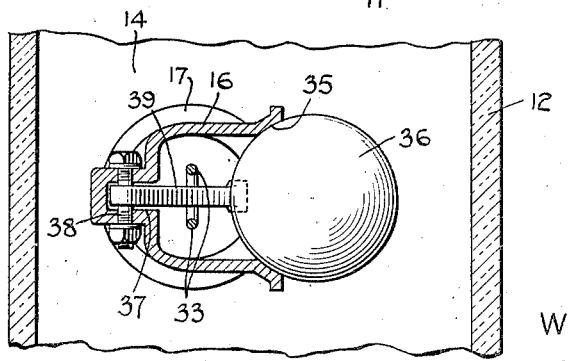
Fig. 3 is a fragmentary sectional plan view taken on the line 3—3 of Fig. 1.

Formed in the body 16 is a recess 37 in which is secured a shaft 38. On such shaft is pivotally mounted an operating lever 39, such operating lever extending ordinarily downwardly and forwardly toward the spherical or ball valve 36, and having its lower free end positioned adjacent the bottom of the valve opening 35, and in position to engage with the spherical or ball valve 36 when the operating lever is rotated on its shaft 38 so as to move the lower end thereof upwardly. The operating lever 39 extends through the elements forming the member 39 of the operating rod above described, and therefore the operating lever 39 will be rotated about the shaft 38 as an axis upon upward movement of the operating member 33 from any cause, as will be apparent from an inspection of Figures 2 and 3. Such movement will tend to throw the spherical or ball valve 36 off the seat 35, and as such spherical or ball valve 36 is lighter than water it will immediately float to the top of any water contained within the tank 12, and such water will freely flow through the valve seat opening in the body 16 downwardly through the elbow 11 into the defecator 10.

In order to constrain the movements of the spherical or ball valve 36 and to insure that such valve will move downwardly with the lowering of the water within the tank 12, to a position where it will ordinarily seat itself on the valve seat 35, I preferably arrange a cage 40 comprising a front member 41 and two side members 42 (but one of which is shown), the lower ends of the front and side members 41 and 42 respectively being reinforced by a member 43 adjacent the bottom thereof. The front member 41 is continued upwardly and inwardly, connecting with the top of the members 42 and thence upwardly, where its upper end is attached by screw 44 to the cap 26. By means of this cage 40 the upward movement of the spherical or ball valve 36 is limited, regardless of the height of the water within the flush tank 12, and such cage guides the valve 36 downwardly as the water lowers in the tank 12, and guiding the valve 36 into such position with respect to the valve opening surrounding the valve seat 35 as to positively insure that such valve will seat itself at the proper moment.

The lever 39 extends through the opening defined by the member 33, and the member 33 in its upward movement engages with the lever 39 at the upper end of the members 31. There is therefore a sliding engagement between the members 33 and the lever 39, as the members 33 move upwardly, thereby rotating the lever 39 so as to bring the free end thereof into engagement with the buoyant spherical or ball valve 36 resulting in forcing such valve 36 off the seat 35. The spherical or ball valve 36, because its buoyancy, will rise in the water in the tank 12 to the limit of the cage composed of the members 41 and 42 thereby assuming a position out of engagement with the valve seat 35. The water within the tank 12 therefore has a free run through the opening in the valve seat 35 and thence through the passage 19 in the body 16 and into the elbow 11 and from such elbow into the defecator 10. As the water lever in the tank 12 is lowered during this operation the buoyant spherical or ball valve 36 will gradually descend and will be brought into position with respect to the valve seat 35 so as to roll or flow into engagement with the valve seat 35 when the major portion of the water in the tank 12 has been discharged.

Whereas I have described my invention by reference to specific forms thereof, it will be understood that many changes and modifications may be made without departing from the spirit of the invention.

I claim:

An improved controlling valve for flush tanks and the like, comprising a valve body having a chamber therein, a lateral opening in said body communicating with the chamber, a valve seat formed in the periphery of said opening, a bouyant spherical valve cooperating with the valve seat, a vertical opening in said valve body, a tubular member mounted therein and having its upper end extending above the normal level of the water in the tank, a closure member for the top of said tubular member having formed therein a bearing, a bearing member formed integral with the valve body at a point below the lateral opening and in alignment with the bearing at the top of the tubular member, a pivoted lever located within the chamber in the valve body and having its free end engaging with the spherical valve, an operating means for moving the free end of said lever into engagement with the spherical valve to dislodge the same from its seat and comprising an intermediate portion in the form of a rectangle, an upper reduced portion extending through and slidably mounted in the bearing in the closure for the top of the tubular member, and a reduced member at the lower end of the rectangular member slidably mounted in the bearing formed integral with valve body, said rectangular member engaging with the said lever at the junction of said rectangular member with the lower reduced portion of the operating means.

WILLIAM C. GROENIGER.